US008666817B2

(12) United States Patent
DeRoller et al.

(10) Patent No.: US 8,666,817 B2
(45) Date of Patent: Mar. 4, 2014

(54) AUTOMATIC PERSONALIZATION OF TWO DIMENSIONAL CODES IN ONE-TO-ONE MARKETING CAMPAIGNS USING TARGET USER INFORMATION

(75) Inventors: Matthew H DeRoller, Webster, NY (US); Stephen Crandall, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 23 days.

(21) Appl. No.: 13/272,782

(22) Filed: Oct. 13, 2011

(65) Prior Publication Data

US 2013/0093773 A1    Apr. 18, 2013

(51) Int. Cl.
*G06Q 30/00* (2012.01)
*B42B 2/00* (2006.01)
*B65H 39/00* (2006.01)

(52) U.S. Cl.
USPC ............... 705/14.67; 705/14.68; 705/14.49; 705/14.4; 270/52.02

(58) Field of Classification Search
USPC ..................................... 705/14.67
See application file for complete search history.

(56) References Cited

U.S. PATENT DOCUMENTS

2010/0243746 A1* 9/2010 Nettesheim et al. .......... 235/494

OTHER PUBLICATIONS

"iPhone and Smart Phones eMail setup", Brazosport College, Jackson, TX, Jun. 24, 2009, found on line at http://www.brazosport.edu/sites/General/InformationTechnology/Instructions/iPhone Setup for eMail.pdf.*
Wiley Publishing, Inc., "Windows 3.1 and the Internet", Internet Gurus Central, Jan. 16, 2002, found on line at net.gurus.org/win31.*
Stahl, "Surfing the Net for E-mail", Information Week, Oct. 16, 1995, found on line at informationweek.com/549/49mtmai.htm.*
Parry, "R U Ready 4 QR Codes?", MultiChannel Merchant, Oct. 1, 2008.*
Benchoff, "How to put your logo in a QR code", Hack a Day, Aug. 11, 2011, on line at hackaday.com/2011/08/11/how-to-put-your-logo-in-a-qr-code.*

* cited by examiner

*Primary Examiner* — John G Weiss
*Assistant Examiner* — Scott C Anderson
(74) *Attorney, Agent, or Firm* — MH2 Technology Law Group LLP (57) ABSTRACT

A method and system for the automated generation of a unique code such as a two dimensional (2D) code such as a quick response (QR) code for each of a plurality of target users. An appearance of the code for each target user can be personalized based on information from a database which includes personalized information for each target user. The appearance of the code is personalized for each user so that, for example, the code is more likely to draw the target user's attention than a code which is not personalized for the target user.

21 Claims, 4 Drawing Sheets

AUTOMATIC PERSONALIZATION OF TWO DIMENSIONAL CODES IN ONE-TO-ONE MARKETING CAMPAIGNS USING TARGET USER INFORMATION

FIELD OF THE EMBODIMENTS

The present teachings relate to the field of product advertising, marketing, and information dissemination, and more particularly to improving target user response to coded information used in direct marketing and information campaigns, for example to barcodes such as 2D barcodes, for example quick response (QR) codes.

BACKGROUND OF THE EMBODIMENTS

Barcodes are used in a wide variety of applications, for example inventory control, automated reordering, point of sale transactions, employee tracking, etc. In some applications, the use of one dimensional barcodes such as linear or UPC barcodes has yielded to the use of two dimensional (2D) codes such as quick response (QR) codes, for example because of their larger data capacity. Further, 2D codes can be used in direct marketing and information dissemination campaigns. In an example of a particular use, a target user such as a potential customer can scan a 2D code using a web-enabled device such as a smartphone or tablet device to obtain information from a product- or company-specific webpage.

Improving user target user awareness of, and response to, campaigns such as information distribution or marketing campaigns such as direct marketing campaigns is an ongoing goal of educators, advertisers, and marketers.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment of the present teachings, a method for generating information to be printed or displayed can include generating a personalized code to be viewed by a target user, wherein the personalized code comprises a personalized code graphic which affects an appearance of the personalized code, wherein the personalized code graphic is determined by target user data which is personalized for the target user, integrating the personalized code including the personalized code graphic into an information page design, and generating a personalized page incorporating the information page design and the personalized code to be viewed by the target user.

In another embodiment of the present teachings, a system for generating information to be printed or displayed can include a database comprising personalized data for a plurality of target users, a code generator for generating a unique code for each target user, a graphic database having a plurality of categorized graphics, and a processor operable to import the personalized data for each of the plurality of target users, the unique code for each target user, and a code graphic from the graphic database into a page design, and to generate a personalized page including the unique code having an appearance which is personalized for each user with the code graphic from the graphic database.

In yet another embodiment of the present teachings, a non-transitory computer readable storage medium having a program stored thereon to generate information to be printed or displayed, the program, when executed by a computer, performs a method comprising generating a personalized code to be viewed by a target user, wherein the personalized code comprises a personalized code graphic which affects an appearance of the personalized code, wherein the personalized code graphic is determined by target user data which is personalized for the target user, integrating the personalized code including the personalized code graphic into an information page design, and generating a personalized page incorporating the information page design and the personalized code to be viewed by the target user.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to the present embodiments of the present teachings, examples of which are illustrated in the accompanying drawings. Wherever possible, the same reference numbers will be used throughout the drawings to refer to the same or like parts.

One-to-one (i.e., "1:1") advertising and information campaigns have been enabled and automated through improved technology including database software and hardware. In 1:1 advertising campaigns for example, a medium such as a flier, mailer, email, text message, etc., includes customer-specific information such as a potential customer's name. Including personal information is useful in capturing a potential customer's attention.

An example of a software solution for automating 1:1 advertising campaigns can include the use of software available from XMPie®, a Xerox® Company. This software can import customer-specific information such as a customer's name from a database and integrate the information into an advertising or other information page design. The page can then be printed and addressed for mailing to the target user or customer through a postal service, or produced and attached to an email or text message for forwarding to the target user using a non-print medium.

A software solution such as XMPie can further create a 2D code matched to a web page. The customer can scan the 2D code using a web-enabled device such as a smartphone or tablet, which then displays the webpage matched to the 2D code. The webpage can include product- or company-specific information.

The use of coded information such as barcodes, for example 2D codes such as QR codes, has continued to become increasingly popular as an advertising and marketing tool. When first introduced on advertising literature such as fliers and brochures, 2D barcodes were highly effective in capturing a potential customer's attention. However, 2D codes have now become commonplace. As 2D codes become even more pervasive, they may no longer draw the customer's interest as they once did.

An embodiment of the present teachings can include the use of interest data that is personalized for a specific person or individual (i.e., a target user). The personalized target user information is incorporated into a 2D code which includes a 2D code graphic which is recognizable by the target user. A code design which graphically or visually incorporates personalized information is more likely to draw the target user's attention than a generic conventional code design. While 2D codes are used as an example herein, it will be realized that other coded machine-readable information which is not generally human readable, such as other one- or two-dimensional barcodes or other machine-readable coded information, may benefit from the use of the present teachings.

Figure 1:
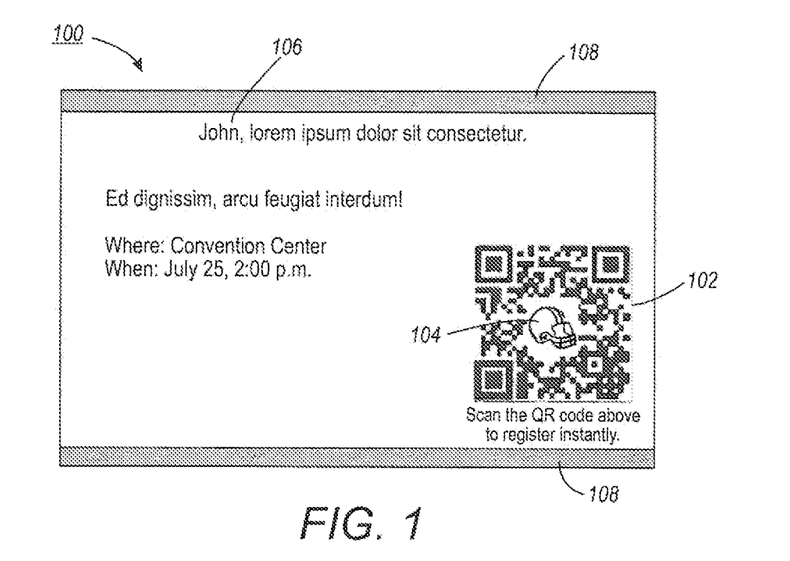
FIGS. 1 and 2 are depictions of information pages which include personalized target user data and a personalized 2D code having a customized appearance for each target user.

FIG. 1 depicts an exemplary personalized page of information 100 which can be generated for a first target user using an embodiment of the present teachings. The page 100 includes personalized information for target user 1 which has been retrieved, for example, from a database. FIG. 1 includes a personalized 2D code 102 and a personalized 2D code graphic 104. Other information fields can also be populated based on a page design from database information, such as target user 1's first name 106 and a border 108 which can be a specific color, for example orange, to match target user 1's stored preference data. Additionally, the 2D code 102 can include target user 1's stored color preference.

Figure 2:
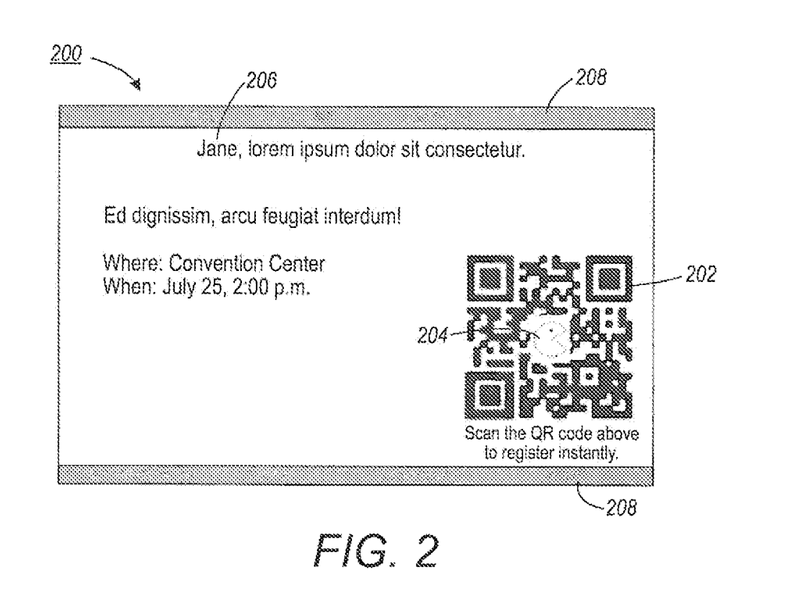

FIG. 2 depicts an exemplary personalized page of information 200 which can be generated for a second target user using an embodiment of the present teachings. The page 200 includes personalized information for target user 2 which has been retrieved, for example, from a database. FIG. 2 includes a personalized 2D code 202 and a personalized 2D code graphic 204. Other information fields can also be populated based on a page design from database information, such as target user 2's first name 206 and a border 208 which can be a specific color, for example green, to match target user 2's stored color preference.

Figure 3:
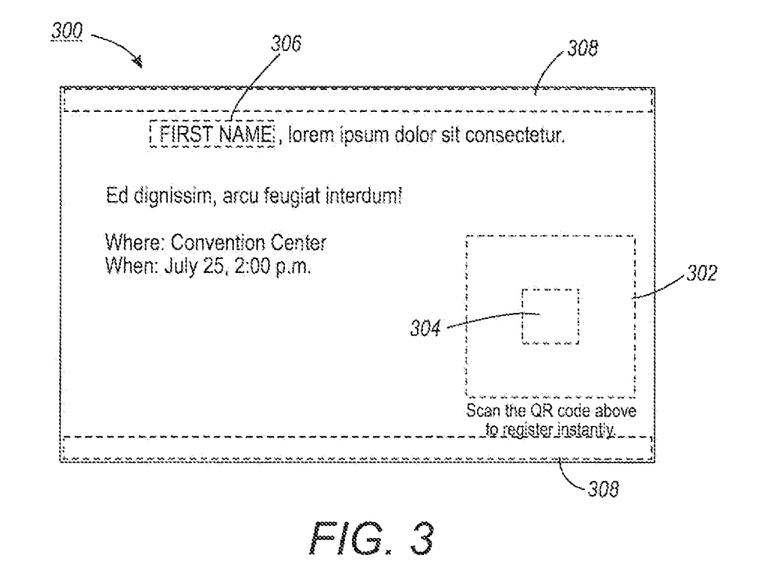
FIG. 3 is an exemplary page design which can be populated with personalized target user data from a database to generate the information pages of, for example, FIGS. 1 and 2.

The personalized fields which are populated to generate the personalized pages of FIGS. 1 and 2 can be based on a page design. For example, FIG. 3 depicts an exemplary information page design 300 including a field 302 for placing a personalized 2D code. In this embodiment, the 2D code field 302 includes a 2D code sub-field 304 in which a personalized code graphic can be placed based on information about the target user from, for example, a database. The code graphic of the sub-field 304 can be centralized as depicted. In another embodiment, the code graphic can be a background image which is the same size as the 2D code but which shows through white areas of the 2D code, as long as the image does not excessively reduce machine readability of the 2D code.

The exemplary page design 300 also includes a personalized name field 306 for each target user's first name, and personalized border fields 308 which can be printed or displayed with the personalized color, for example if the database includes information regarding the target user's favorite color. The page design can include other graphics or text which is the same for each page of information for every target user, such as location and date of an event and other desired text which is depicted in Lorem Ipsum in FIGS. 1-3.

Figure 4:
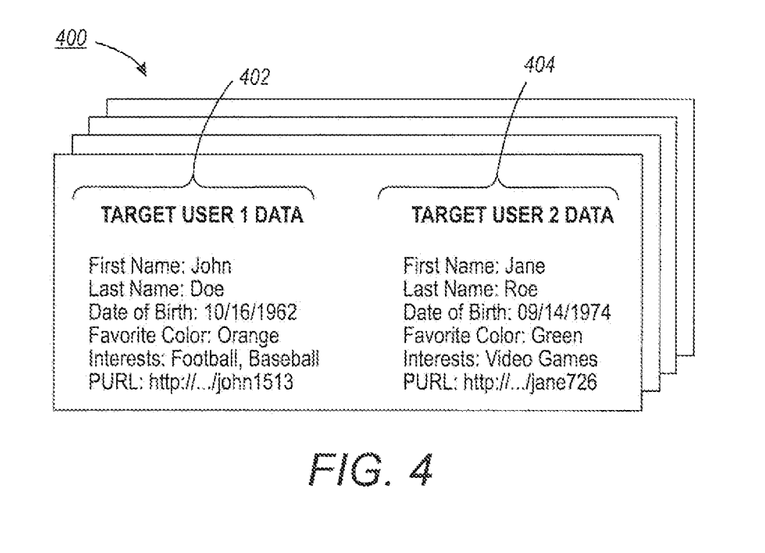
FIG. 4 is a depiction which represents a database including personalized data for a plurality of target users which can be used, to populate the page design of FIG. 3 to generate the information pages of, for example, FIGS. 1 and 2.

The personalized data for each target user which populates the FIG. 3 fields to generate information pages 1 and 2 can originate from a database 400 as depicted in FIG. 4. FIG. 4 shows specific information for target user 1 402 and target user 2 404, and it will be understood that any number of target users and data points can be included in the database. As depicted in FIG. 4, specific information can include, for example, the target users' names, dates of birth, favorite colors, hobbies/avocations, names of family members, favorite sports or sports teams, automobile preferences, or any other personalized information (i.e., 1:1 data) which is specific to the individual target user.

In the FIG. 4 example, the database 400 has also been populated with a personalized user resource link (PURL) for each target user which will be associated with an individualized 2D code for each user. The PURL can be generated and imported into the database by a software solution such as XMPie. The 2D code 102 for target user 1's page 100 can be linked with the PURL "http:// . . . /john1513" from the database information for target user 1. As a result, if target user 1 scans the 2D code 102 of FIG. 1, his smart device can display a personalized webpage linked to the target user-specific PURL "http:// . . . /john1513". The webpage itself can also be personalized using personalized target user 1 data from the database 400. Similarly, 2D code 202 can be linked with the PURL "http:// . . . /jane726" such that if target user 2 scans the 2D code 202 of FIG. 1, her smart device can display a different webpage which can be personalized for target user 2 based on data from the database 400. In other embodiments, scanning the 2D code can register the target user in a seminar, enter the target user in a drawing, initiate a postal mailing or emailing of information using an address stored in the database for the target user, etc., or perform more than one of these actions.

Figure 5:
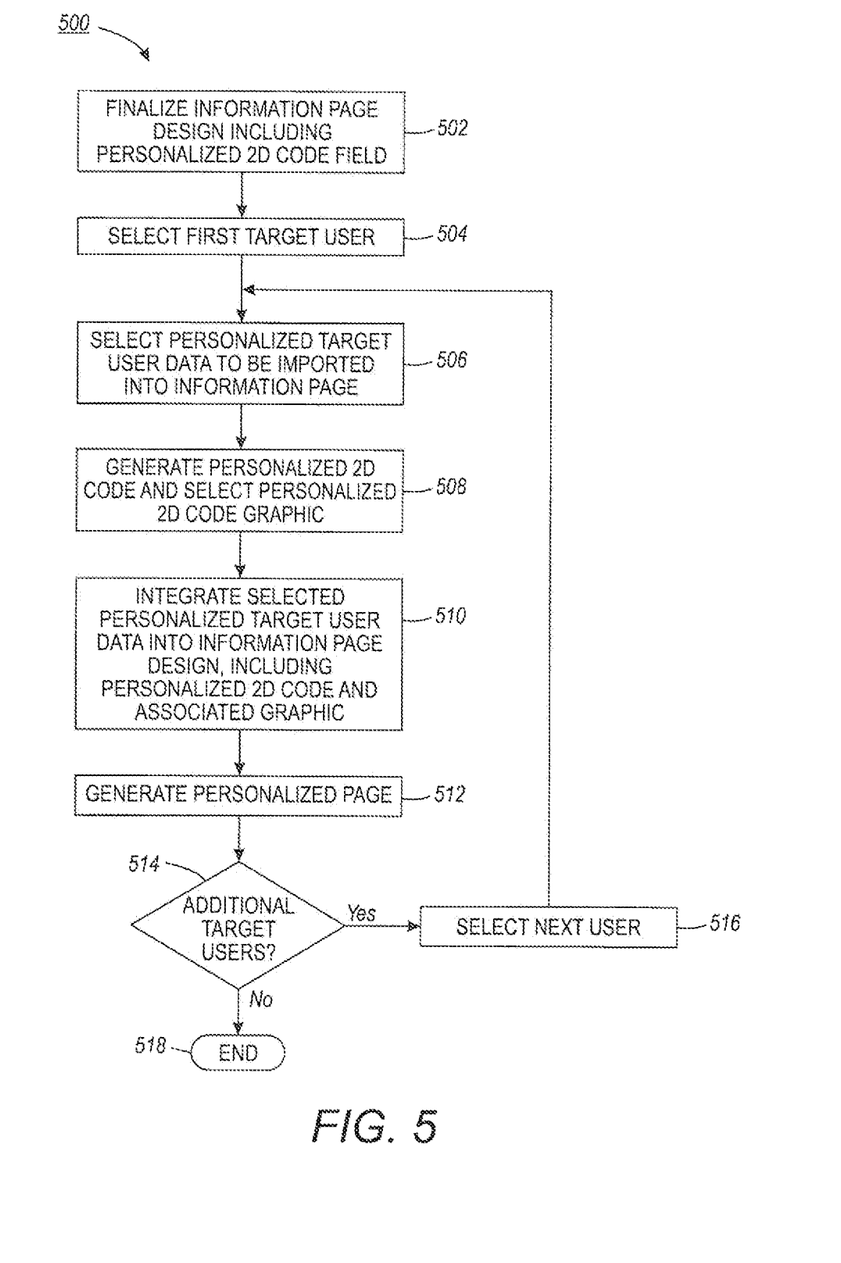
FIG. 5 is a flow chart depicting an embodiment of a method for generating information including a personalized code having a customized appearance for each target user based on database information.

FIG. 5 is a flowchart depicting an embodiment of the present teachings, which can include a method for generating information, for example producing a page of information which is personalized for each target user. The information generated can include a code such as a 2D code which is to be viewed by a target user, such as 2D codes 102 (FIG. 1) and 202 (FIG. 2). The 2D code generated will have appearance which is based on a target user's personalized information. Generating the page of information can include printing ink onto a print medium such as paper as well as displaying a digital depiction onto, for example, a computer display, smart device screen such as a smartphone or tablet, an electronic billboard, etc. Generating the page of information can further include sending information in digital form or other electronic form to a target user, even if the information is not displayed or opened. The information can include an advertisement with intent to sell a product, a notification of an event, information being brought to a target user's attention, etc. For purposes of this disclosure, a page of information can include less than one page or one or more pages of information for printing, regardless of whether it is actually printed. A page of information can also include less than one screen of information for display on a screen, or one or more screens of information for display, regardless of whether it is actually displayed.

The method 500 for generating or producing a page of information can begin at 502, where the information page design is finalized, for example the page design 300 of FIG. 3. The page design can include at least a personalized code field 302 such as a 2D code field, and a code graphic sub-field 304 such as a 2D code graphic sub-field. The page design 300 and can include additional fields as well such as a first name field 306 and a border color field 308. Other page designs and personalized fields are contemplated at 502.

After the information page design is completed 502, the first target user is selected 504, then personalized target user data is selected 506, for example, from a database 400.

Next, a personalized 2D code is generated 508. Generation of the personalized 2D code can include linking the 2D code to the PURL for the selected target user which is generated by the software solution. Additionally, generation of the personalized 2D code can include the selection of the 2D code graphic to be associated with the 2D code based on 1:1 data from the database. The 2D code graphic will affect the appearance of the 2D code, and will have a visual appearance which is recognizable by the target user. The 2D code graphic can be based on any of the 1:1 target user data, for example interest, hobby, favorite sports team, etc. In the case of target user 1, interests include football, so a 2D code graphic is selected from a plurality of categorized graphics based on target user 1's interest or other personalized data. In an embodiment, the number of 2D code graphic categories can be at least as large or larger than the number of interest categories across all target users. In another embodiment, the number of 2D code graphic categories can be less than the number of interest categories across all target users, in which case a 2D code graphic can be selected at random if there is not a 2D code category which matches the target user's interest. In an embodiment, each graphic category can include at least one graphic, and may include several different graphics to decrease repetition. If a target user's data does not include an interest (or other information type upon which the 2D graphic is being based) a graphic can be selected at random or from a category which has a high rate of target user interest based on all target users in the database.

After generating the personalized 2D code and selecting the associated graphic 508, the personalized data including the 2D code and associated 2D code graphic are integrated or imported into the page design 510, and the personalized page is generated or produced 512. Generation of the personalized page can include printing the page, preparing the information for printing, displaying the page in digital form onto a screen, or preparing the information for display regardless of whether it is actually printed or displayed.

After generating personalized page for target user 1 such as page 100 of FIG. 1, if there are additional target users 514 the next target user (target user 2) is selected 516 and the process as described above and depicted at 506, 508, and 510 repeats to generate a personalized page 512 for the next target user, for example personalized page 200 as depicted in FIG. 2 for target user 2. The personalized 2D code 202 can be linked with target user 2's PURL (http:// . . . jane726) from the database 400 and the 2D graphic 204 can be selected based on target user 2's interest information (or other selected information) from the database 400. Other fields, such as first name 206, color of the border 208, etc., can be personalized for target user 2 based on personalized information from the database 400.

This process can be continued until a personalized page is generated 512 for all desired target users. When there are no target users remaining at 514, the process can end 518.

In an embodiment, the personalized 2D code graphic to be viewed can be selected using techniques other than those described above. For example, available personalized data such as target user behavioral data can be analyzed to determine a personalized code graphic which would be likely to draw a target user's attention. In an exemplary embodiment of the present teachings used by a credit card company, purchase data of the target user can be analyzed to select a 2D code graphic. If the target user has a large number of, for example, scuba-related purchases, a graphic image related to scuba diving such as a dive flag or scuba tank can be selected to be associated with the 2D code. Further, a webpage linked to the 2D code which includes the 2D code graphic can also use this behavioral data and display personalized information of interest to the target user.

In another embodiment, a 2D code graphic can be selected by the target user. For example, a webpage linked to an initial 2D code can include a field in which the target user can select one or more of a plurality of 2D code graphics which will be used on subsequent information pages. The user-selected 2D code graphic preference can be stored in database 400 (FIG. 4) for future use.

Figure 6:
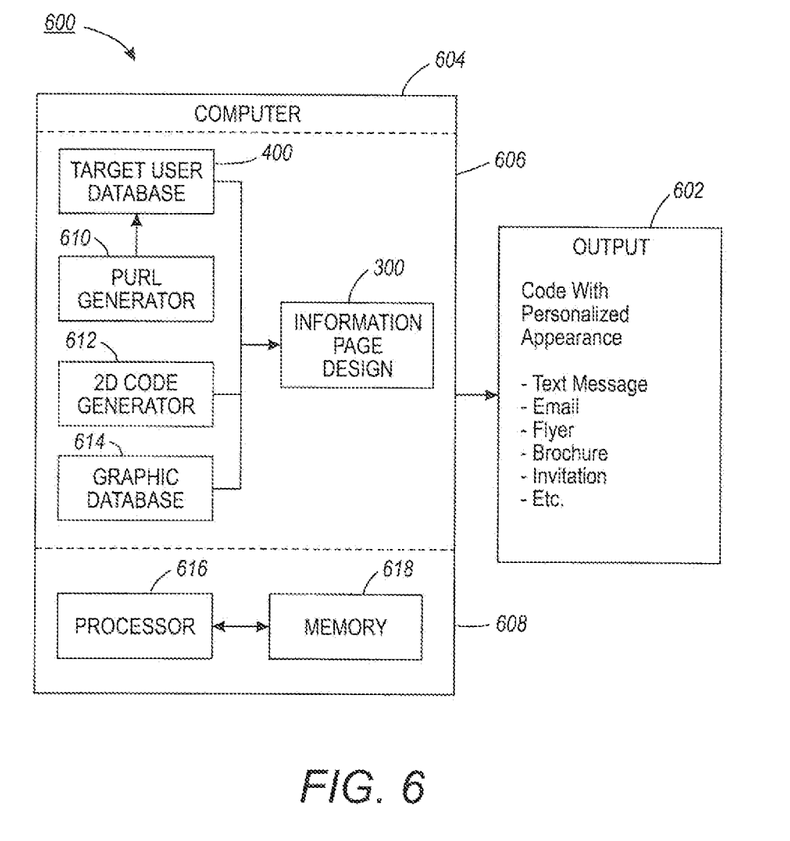
FIG. 6 is a block diagram of an exemplary computer system according to an embodiment of the present teachings which can output a personalized page including a personalized code.

FIG. 6 depicts a computer system 600 in accordance with an embodiment of the present teachings which can be used to generate output 602 including a personalized 2D code having a personalized appearance for each target user. The computer system 600 can include a computer 604 with software 606 and hardware 608. The software 606 can include a target user database 400, a PURL generator 610, a code generator such as a 2D code generator 612 and a graphic database 614 including a plurality of categorized graphics. The PURL generator can output a PURL unique to each target user to the database 400. The computer 604 can include hardware 606 such as a microprocessor (processor) 616 and memory 618. The processor 616 of the computer 604 is operable to import the personalized data for each target user from the database 400, the unique code for each target user generated by the code generator 612, and a graphic from the graphic database 614, and to sequentially populate the information page design 300 with personalized information for each target user, and generate the output 602. The output 602 can be a personalized page including the unique code having an appearance which is personalized for each user with a graphic from the graphic database.

It will be realized that the computer system 600 of FIG. 6 is merely an example of one computer system design for generating output 602 including a personalized code with an appearance which is customized for each target user based on information from a target user database 400. Many different computer system designs for implementing an embodiment of the present teachings are contemplated.

Thus various embodiments of the present teachings can personalize the appearance of codes such as 2D codes, for example as a tool in 1:1 marketing. These codes can allow tracking of direct mail campaigns. Further, these codes can allow target users to interact via their smartphones to gain access to additional information. The appearance of the 2D codes can personalized for each target user based on information known about the target user, such as favorite color, sports team, travel destination, birth date, home town, hobby, vocation, avocation, preferred foods, family information, etc.

Embodiments of the present teachings can include a 2D code generator that can accept target user data as one or more input parameters for automatically creating a 2D code having a personalized appearance. In an embodiment, the 2D code generator can adhere to ISO/IEC 18004:2000 specifications. Data elements which can vary with each user can be used to affect the appearance of the 2D code. The 2D code data (URL, vCard, etc.) can affect 2D code appearance parameters such as color, center image, size, background image, etc., or more than one of these. In an embodiment, an input data reader imports data from variable data elements from a datasheet, database, etc. which includes personalized data regarding the target user. The input data can then be mapped to one or more of these variable data elements. A personalized 2D code can be output. The software can automatically cycle through a database of variable data elements to creates any number of personalized 2D codes. An embodiment of the present teachings can be appended to existing 1:1 marketing print or display item workflows.

Output of various embodiments of the present teachings can include post cards or other postal mail, reminders, invitations, drawings, hardcopy printings onto paper or other print media, digital output onto computer screens, smartphone screens, tablet screens, text messages or emails which are opened by a target user or remain unopened by the target user, etc. That is, the output need not be printed or displayed to practice various embodiments of the present teachings, although other embodiments for generating a page of information can include printing or displaying less than one, one, or more than one page of information.

It will be appreciated that the present teachings can be applied to codes such as barcodes including 1D barcodes and 2D barcodes, 2D codes, etc. The codes will generally include information which is machine readable and not human readable, although the codes can include human-readable information in addition to the machine-readable information. The codes will also generally include a recognizable code graphic. The code graphic can be smaller than the 2D code, the same size as the 2D code, or larger than the 2D code. In an embodiment, the code graphic is smaller than the code and centered within the code in the horizontal and vertical directions. In another embodiment, the 2D code graphic is the same size as the 2D code and shows through white areas of the 2D code.

Certain embodiments of the present teachings may be performed as a computer program. The computer program may exist in a variety of forms both active and inactive. For example, the computer program can exist as software program(s), which can include program instructions in source code, object code, executable code, or other formats; firmware program(s); or hardware description language (HDL) files. Any of the above can be embodied on a computer readable medium, which include storage devices. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Note that while the exemplary method is illustrated and described above as a series of acts or events, it will be appreciated that the present invention is not limited by the illustrated ordering of such acts or events. For example, some acts may occur in different orders and/or concurrently with other acts or events apart from those illustrated and/or described herein, in accordance with the present teachings. In addition, not all illustrated steps may be required to implement a methodology in accordance with the present teachings, and other steps can be added or modified.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. $-1$, $-2$, $-3$, $-10$, $-20$, $-30$, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal.

The invention claimed is:

1. A method for generating information to be printed or displayed using a non-transitory computer readable storage medium having a program stored thereon to generate information to be printed or displayed, the method comprising:

generating a personalized code to be viewed by a potential customer, wherein the personalized code comprises a personalized code graphic which affects an appearance of the personalized code, wherein the personalized code graphic is selected using potential customer data stored in a database comprising personalized data for a plurality of potential customers and is personalized for the potential customer based on the potential customer data from the database, and the personalized code further comprises at least one of a machine-readable barcode and a quick response code, wherein the personalized code graphic is based on individualized personal information specific to the potential customer and is selected to draw an attention of the potential customer to the at least one of the machine-readable barcode and the quick response code;

integrating the personalized code including the personalized code graphic and the at least one of the machine-readable barcode and the quick response code into an information page design;

generating a personalized page incorporating the information page design and the personalized code to be viewed by the potential customer; and outputting the personalized page onto at least one of a print medium and a display screen.

2. The method of claim 1, wherein the personalized data for the plurality of potential customers in the database comprises potential customer data regarding at least one of an interest, hobby, vocation, or avocation of each potential customer of the plurality of potential customers, and the method further comprises selecting the personalized code graphic based on the at least one of the interest, hobby, vocation, or avocation of the potential customer stored in the database comprising personalized data for the plurality of potential customers.

3. The method of claim 2, wherein the personalized data for the plurality of potential customers in the database comprises potential customer data regarding analyzed behavioral data for the plurality of potential customers, and the method further comprises selecting the personalized code graphic based on analyzed potential customer behavioral data stored in the database comprising personalized data for the plurality of potential customers.

4. The method of claim 1, wherein generating the personalized code generates the at least one of the barcode and the quick response code as a personalized two dimensional (2D) code.

5. The method of claim 1, wherein the potential customer is a first potential customer, the personalized code is a first personalized code, and the personalized page is a first personalized page to be viewed by the first potential customer, the method further comprising:

generating a second personalized code to be viewed by a second potential customer, wherein the second personalized code comprises a second personalized code graphic which affects an appearance of the second personalized code, wherein the second personalized code graphic is selected using potential customer data from the database comprising personalized data for the plurality of potential customers and is personalized for the second potential customer based on the potential customer data from the database, and the second personalized code further comprises the at least one of the machine-readable barcode and a quick response code;

integrating the second personalized code including the second personalized code graphic and the at least one of the machine-readable barcode and the quick response code into the information page design;

generating a second personalized page incorporating the information page design and the second personalized code to be viewed by the second potential customer, wherein the second personalized page is different from the first personalized page; and outputting the second personalized page onto at least one of a print medium and a display screen.

6. The method of claim 5, wherein the personalized data for the plurality of potential customers in the database comprises potential customer data regarding at least one of an interest, hobby, vocation, or avocation of each potential customer of the plurality of potential customers, and the method further comprises:

selecting the first personalized code graphic based on at least one of an interest, hobby, vocation, or avocation of the first potential customer stored in the database comprising the personalized data for the plurality of potential customers; and selecting the second personalized code graphic based on at least one of an interest, hobby, vocation, or avocation of the second potential customer stored in the database comprising the personalized data for the plurality of potential customers, wherein the first personalized code graphic is different from the second personalized code graphic.

7. The method of claim 1, further comprising:

generating a plurality of unique personalized user resource link (PURL), wherein the PURL is different for each of the plurality of potential customers;

generating a plurality of personalized pages, wherein one personalized page is generated for each of the plurality of potential customers; and associating each of the plurality of PURLs with one of the plurality of personalized pages for each of the plurality of potential customers.

8. A system for generating information to be printed or displayed, comprising:

a database comprising personalized data for a plurality of potential customers;

a code generator for generating a unique code for each potential customer, wherein the unique code comprises at least one of a bar code and a quick response code;

a graphic database having a plurality of categorized graphics; and a processor operable to select a code graphic from the graphic database based on the personalized data from the database for each potential customer and to import the personalized data for each of the plurality of potential customers, the unique code for each potential customer, and the code graphic from the graphic database into a page design, and to generate a personalized page including the unique code having an appearance which is personalized for each user with the code graphic from the graphic database, wherein the code graphic is based on individualized personal information specific to the potential customer and is selected to draw an attention of the potential customer to the at least one of the bar code and the quick response code.

9. The system of claim 8, wherein the code generator is a two dimensional (2D) code generator.

10. The system of claim 8, further comprising:
- a personalized user resource link (PURL) generator for generating a unique PURL that is different for each potential customer; and
- the processor is further operable to associate the unique PURL for each potential customer with the unique code for each potential customer.

11. The system of claim 8, wherein the database comprises each potential customer's first name, last name, and at least one of an interest, hobby, vocation, or avocation of each potential customer.

12. The system of claim 11, wherein the personalized data for the plurality of potential customers in the database comprises potential customer data regarding at least one of an interest, hobby, vocation, or avocation of each potential customer of the plurality of potential customers, and the appearance of the unique code is based on at least one of the interest, hobby, vocation, or avocation of each potential customer from the database.

13. The system of claim 11, wherein the personalized data for the plurality of potential customers in the database comprises potential customer data regarding analyzed behavioral data for the plurality of potential customers, and the appearance of the unique code is based on analyzed potential customer behavioral data from the database.

14. A non-transitory computer readable storage medium having a program stored thereon to generate information to be printed or displayed, the program, when executed by a computer, performs a method comprising:
- selecting a personalized code graphic from a graphic database having a plurality of categorized graphics, wherein the personalized code graphic is selected to draw an attention of a potential customer to the personalized code graphic using data stored in a database comprising personalized data for a plurality of potential customers using potential customer data which is personalized for the potential customer;
- generating a personalized code to be viewed by a potential customer, wherein the personalized code comprises the personalized code graphic which affects an appearance of the personalized code and at least one of a barcode and a quick response code, wherein the personalized code graphic is based on individualized personal information specific to the potential customer and is selected to draw an attention of a potential customer to the at least one of the barcode and the quick response code;
- integrating the personalized code including the personalized code graphic and the at least one of the barcode and the quick response code into an information page design; and
- generating a personalized page incorporating the information page design, the at least one of the barcode and the quick response code, and the personalized code to be viewed by the potential customer.

15. The non-transitory computer readable storage medium of claim 14, wherein the personalized data for the plurality of potential customers in the database comprises potential customer data regarding at least one of an interest, hobby, vocation, or avocation of each potential customer of the plurality of potential customers, and the program, when executed by a computer, performs the method further comprising selecting the personalized code graphic based on the at least one of the interest, hobby, vocation, or avocation of the potential customer stored in the database comprising personalized data for the plurality of users.

16. The non-transitory computer readable storage medium of claim 14, wherein the personalized data for the plurality of potential customers in the database comprises potential customer data regarding analyzed behavioral data for the plurality of potential customers, and the program, when executed by a computer, performs the method further comprising selecting the personalized code graphic based on analyzed potential customer behavioral data stored in the database comprising the personalized data for the plurality of potential customers.

17. The non-transitory computer readable storage medium of claim 14, wherein the program, when executed by a computer, generates the at least one of the barcode and the quick response code as a personalized two dimensional (2D) code.

18. The non-transitory computer readable storage medium of claim 14, wherein the potential customer is a first potential customer, the personalized code is a first personalized code, and the personalized page is a first personalized page to be viewed by the first potential customer and the program, when executed by a computer, performs the method further comprising:
- generating a second personalized code to be viewed by a second potential customer, wherein the second personalized code comprises a second personalized code graphic which affects an appearance of the second personalized code, wherein the second personalized code graphic is selected using potential customer data from the database comprising personalized data for the plurality of potential customers and is personalized for the second potential customer based on the potential customer data from the database, and the second personalized code further comprises the at least one of the machine-readable barcode and a quick response code;
- integrating the second personalized code including the second personalized code graphic and the at least one of the machine-readable barcode and the quick response code into the information page design;
- generating a second personalized page incorporating the information page design and the second personalized code to be viewed by the second potential customer, wherein the second personalized page is different from the first personalized page; and
- outputting the second personalized page onto at least one of a print medium and a display screen.

19. The non-transitory computer readable storage medium of claim 18, wherein the personalized data for the plurality of potential customers in the database comprises potential customer data regarding at least one of an interest, hobby, vocation, or avocation of each potential customer of the plurality of potential customers, the personalized potential customer data is a personalized first potential customer data, and the program, when executed by a computer, performs the method further comprising:
- selecting the first personalized code graphic based on at least one of an interest, hobby, vocation, or avocation of the first potential customer stored in the database comprising the personalized data for the plurality of potential customers; and
- selecting the second personalized code graphic based on at least one of an interest, hobby, vocation, or avocation of the second potential customer stored in the database comprising the personalized data for the plurality of potential customers, wherein the first personalized code graphic is different from the second personalized code graphic.

20. The non-transitory computer readable storage medium of claim 19, wherein the program, when executed by a computer, performs the method further comprising:

selecting the first personalized code graphic based on analyzed behavioral data of the first potential customer stored in the database comprising the personalized data for the plurality of potential customers; and selecting the second personalized code graphic based on analyzed behavioral data of the second potential customer stored in the database comprising the personalized data for the plurality of potential customers, wherein the first personalized code graphic is different from the second personalized code graphic.

21. The non-transitory computer readable storage medium of claim 14, wherein the program, when executed by the computer, performs the method further comprising:

generating a plurality of unique personalized user resource link (PURL), wherein the PURL is different for each of the plurality of potential customers;

generating a plurality of personalized pages, wherein one personalized page is generated for each of the plurality of potential customers; and associating each of the plurality of PURLs with one of the plurality of personalized pages for each of the plurality of potential customers.

\* \* \* \* \*